(12) United States Patent
Choi et al.

(10) Patent No.: US 12,519,155 B2
(45) Date of Patent: *Jan. 6, 2026

(54) SECONDARY BATTERY AND BATTERY MODULE HAVING THEREOF

(71) Applicant: SK On Co., Ltd., Seoul (KR)

(72) Inventors: Yang Kyu Choi, Daejeon (KR); Seok Min Kim, Daejeon (KR); Myeong Hwan Ma, Daejeon (KR); Seo Roh Rhee, Daejeon (KR); Hae Ryong Jeon, Daejeon (KR); Seung Hoon Ju, Daejeon (KR); Dong Ha Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 604 days.

This patent is subject to a terminal disclaimer.

(21) Appl. No.: 17/931,291

(22) Filed: Sep. 12, 2022

(65) Prior Publication Data
US 2023/0006278 A1    Jan. 5, 2023

Related U.S. Application Data

(63) Continuation of application No. 16/990,335, filed on Aug. 11, 2020, now Pat. No. 11,476,516.

(30) Foreign Application Priority Data

Aug. 13, 2019  (KR) .......................... 10-2019-0098782

(51) Int. Cl.
*H01M 10/6554* (2014.01)
*H01M 10/613* (2014.01)
*H01M 10/647* (2014.01)

(52) U.S. Cl.
CPC ..... *H01M 10/6554* (2015.04); *H01M 10/613* (2015.04)

(58) Field of Classification Search
CPC ........... H01M 10/6554; H01M 10/613; H01M 10/647; H01M 2220/20; H01M 10/653;
(Continued)

(56) References Cited

U.S. PATENT DOCUMENTS 11,416,516 B2 *  8/2022  Cohen .................. G06F 9/4881
11,476,516 B2 * 10/2022  Choi .................... H01M 10/653
(Continued)

FOREIGN PATENT DOCUMENTS

CN        104282849 A       1/2015
CN        208045659 U      11/2018
(Continued)

*Primary Examiner* — Lisa S Park
(74) *Attorney, Agent, or Firm* — The Webb Law Firm

(57) ABSTRACT

A secondary battery may include a cell body member accommodating an electrode assembly therein, including three sealing sides and provided adjacently to a cooling plate member; and the cell body member, in contact with a heat conductive member on a lower surface thereof includes a surface area-increasing groove formed to be concave in the lower surface thereof and the lower surface is a region in which a sealing portion is not formed, the heat conductive member is provided in at least a portion between the cell body member and the cooling plate member to form a heat path for transferring heat from the cell body member to the cooling plate member, the surface area-increasing groove includes a curved-region in a cross section in a thickness direction of the cell body member, and the curved-region is in contact with the heat conductive member.

20 Claims, 9 Drawing Sheets

(58) Field of Classification Search
CPC ......... H01M 10/6555; H01M 10/6556; H01M 50/211; H01M 50/548; H01M 10/625; H01M 10/6551; H01M 50/102; H01M 50/20; H01M 10/655; H01M 50/116; Y02E 60/10

See application file for complete search history.

(56) References Cited

U.S. PATENT DOCUMENTS

| | | | |
|---|---|---|---|
| 2004/0157115 A1 | 8/2004 | Bouffard et al. | |
| 2008/0251066 A1 | 10/2008 | Tessarolo | |
| 2012/0107663 A1* | 5/2012 | Burgers | H01M 10/6556 429/120 |
| 2015/0180096 A1* | 6/2015 | Schwab | H01M 10/653 165/185 |
| 2018/0062226 A1* | 3/2018 | Raiser | H01M 10/613 |
| 2018/0212207 A1 | 7/2018 | Mino et al. | |
| 2018/0254510 A1 | 9/2018 | Cho et al. | |
| 2018/0331336 A1 | 11/2018 | Choi et al. | |
| 2019/0198952 A1 | 6/2019 | Choi et al. | |

FOREIGN PATENT DOCUMENTS

| | | |
|---|---|---|
| CN | 109643768 A | 4/2019 |
| CN | 109994798 A | 7/2019 |
| JP | 2001256941 A | 9/2001 |
| JP | 2007180091 A | 7/2007 |
| KR | 1020080022915 A | 3/2008 |
| KR | 1020120095703 A | 8/2012 |
| KR | 1020130142561 A | 12/2013 |
| KR | 1020160073233 A | 6/2016 |
| KR | 1020180020546 A | 2/2018 |
| KR | 1020190078521 A | 7/2019 |
| WO | 2005087850 A1 | 9/2005 |
| WO | 2014137017 A1 | 9/2014 |
| WO | 2019138744 A1 | 7/2019 |

* cited by examiner

SECONDARY BATTERY AND BATTERY MODULE HAVING THEREOF

CROSS-REFERENCE TO RELATED APPLICATIONS

This application is a continuation of U.S. patent application Ser. No. 16/990,335 filed Aug. 11, 2020, which claims priority to Korean Patent Application No. 10-2019-0098782 filed Aug. 13, 2019, the disclosures of which are hereby incorporated by reference in their entirety.

BACKGROUND

1. Field of the Invention

The present disclosure relates to a secondary battery and a battery module including the same.

2. Description of Related Art

With increased demand for mobile devices, electric vehicles, and the like, along with the development of related technologies, demand for a secondary battery as an energy source has rapidly increased. A secondary battery may be repeatedly charged and discharged as mutual conversion between chemical energy and electrical energy is reversible in a secondary battery. A cell body member of a secondary battery refers to a laminated film case for protecting an electrode assembly of an anode, a cathode, a separation film, and an electrolyte solution, which are the main components of a secondary battery.

However, such an electrode assembly generates heat while undergoing the process of charging and discharging, and a temperature rise due to the generated heat deteriorates performance of the secondary battery.

Accordingly, the cell body member in which the electrode assembly is accommodated is configured such that a cooling plate member for cooling, a heat sink, and the like, are connected thereto.

In particular, in the case of a secondary battery having the cell body member having three sealing surfaces, a lower surface, the cooling plate member and a heat sink are connected thereto.

To improve cooling efficiency of such a secondary battery, a heat conductive member is provided between the cooling plate member and the cell body member.

There has been research into such heat conductive members, involving adding an additive, or the like, to enhance heat conductivity; however, there are limits resulting from the addition of additives and use of comparatively expensive heat conductive materials for heat conductivity enhancement.

Further, there is also a problem in that there is a limit to increasing heat conductivity using properties of the additives and the heat conductive member.

Therefore, there is an increasing need for research into a secondary battery and a battery module including the same to solve the above problems and limitations.

SUMMARY OF THE INVENTION

An aspect of the present disclosure is to provide a secondary battery capable of overcoming a limitation of heat conductivity improvement due to properties of a heat conductive member, and a battery module including the same.

Another aspect of the present disclosure is to provide a secondary battery capable of enhancing heat conductivity while reducing use of a heat conductive member, and a battery module including the same.

According to an example embodiment of the present disclosure, a secondary battery may include a cell body member accommodating an electrode assembly therein, including three sealing sides and provided adjacently to a cooling plate member; and wherein the cell body member, in contact with a heat conductive member on a lower surface thereof comprises a surface area-increasing groove formed to be concave in the lower surface thereof and the lower surface is a region in which a sealing portion is not formed, wherein the heat conductive member provided in at least a portion between the cell body member and the cooling plate member to form a heat path for transferring heat from the cell body member to the cooling plate member, wherein the surface area-increasing groove includes a curved-region in a cross section in a thickness direction of the cell body member, wherein the curved-region is in contact with the heat conductive member.

In this case, the cell body member of the secondary battery according to an example embodiment may be formed to have the surface area-increasing groove formed to be asymmetrical.

In addition, the surface area-increasing groove of the secondary battery according to an example embodiment may be asymmetrical in a thickness direction of the cell body member.

The surface area-increasing groove of the secondary battery according to an example embodiment has one side formed to have a first radius of curvature in the thickness direction of the cell body member and the other side, connected thereto, formed to have a second radius of curvature, wherein the first and second radii of curvature are different from each other.

Further, the cell body member of the secondary battery according to an example embodiment may be formed to have the surface area-increasing groove formed in a central portion in the thickness direction to be elongated in a length direction.

The cell body member of the secondary battery according to an example embodiment may be formed with the surface area-increasing groove in the central portion of a thickness direction and a rounded portion at both ends in the thickness direction.

In this case, the cell body member of the secondary battery according to an example embodiment may have the rounded portion having a radius of curvature smaller than a radius of curvature of the surface area-increasing groove.

According to another example embodiment of the present disclosure, a battery module may include a plurality of stacked secondary batteries, wherein each secondary battery includes a cell body member accommodating an electrode assembly therein, the cell body member includes three sealing sides; a heat conductive member provided in at least a portion between the cell body member and a cooling plate member; and a housing member comprising the cooling plate member for exchanging heat with the cell body member mediated by the heat conductive member and accommodating the plurality of stacked secondary batteries therein, wherein the cell body member comprises a surface area-increasing groove formed to be concave on a lower surface thereof in contact with the heat conductive member, and the lower surface is a region in which a sealing portion is not formed, wherein the surface area-increasing groove includes a curved-region in a cross section in a thickness direction of the cell body member, wherein the curved-region is in contact with the heat conductive member.

In this case, the surface area-increasing groove of the battery module according to another example embodiment may be asymmetrical in a thickness direction of the cell body member.

Further, the surface area-increasing groove according to another example embodiment may have one side formed to have a first radius of curvature in the thickness direction of the cell body member and the other side, connected thereto, formed to have a second radius of curvature, wherein the first and second radii of curvature are different from each other.

Additionally, when the cell body member is seated and coupled onto the heat conductive member applied to the cooling plate member, the surface area-increasing groove according to another example embodiment may have the first radius of curvature of the one side initially contacting the heat conductive member applied to the cooling plate member greater than the second radius of curvature.

Additionally, the housing member further includes a side wall forming a side portion of the housing member.

Additionally, the housing member further includes a cover member provided on an upper end of the side wall to protect an upper end of the secondary batteries.

Additionally, the housing member further includes a bus bar for electrically connecting the secondary batteries.

Further, the cell body member according to another example embodiment may be formed with the surface area-increasing groove in the central portion of a thickness direction and a rounded portion at both ends in the thickness direction, wherein a radius of curvature of the rounded portion is smaller than a radius of curvature of the surface area-increasing groove.

The cell body member according to another example embodiment may have the surface area-increasing groove formed in a central portion in a thickness direction to accommodate the heat conductive member and both ends in the thickness direction to be in contact with the cooling plate member.

The cooling plate member according to another example embodiment may have a surface-increasing tab formed to protrude from a portion in which the cell body member is seated and having at least a portion inserted in the surface area-increasing groove.

Specifically, the surface-increasing tab according to another example embodiment may be formed to protrude to correspond to a shape of the surface area-increasing groove.

In addition, the surface-increasing tab according to another example embodiment may be formed to have a width smaller than a width of the surface area-increasing groove in the thickness direction of the cell body member.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
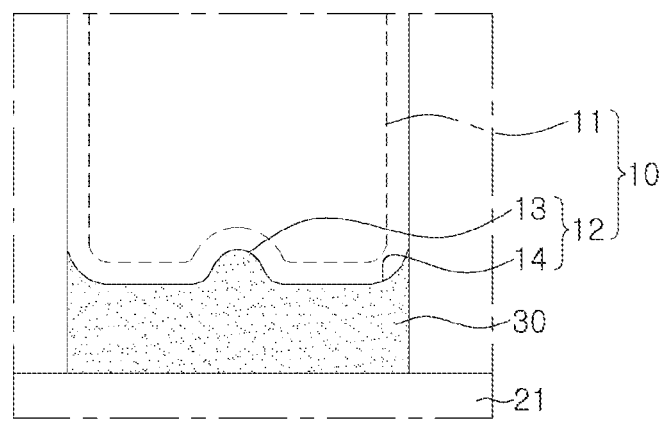
FIG. 1 is a front view of a secondary battery of the present disclosure.

Hereinafter, example embodiments of the present disclosure will be described with reference to the accompanying drawings. The present disclosure is not limited to example embodiments, and it is to be understood that modifications can be made without departing from the spirit and scope of the present disclosure. Shapes and sizes of the elements in the drawings may be exaggerated for clarity of description.

In addition, an expression used in the singular encompasses the expression of the plural, unless it has a clearly different meaning in context. Identical or corresponding elements will be given the same reference numerals.

The present disclosure relates to a secondary battery 10 and a battery module including the same, which can overcome a limitation on heat conductivity improvement, resulting from properties of a heat conductive member 30, while, in another aspect, improving heat conductivity was well as reducing use of the heat conductive member 30. Accordingly, the secondary battery 10 of the present disclosure and the battery module including the same may have improved heat conductivity while preventing a price increase.

Figure 2:
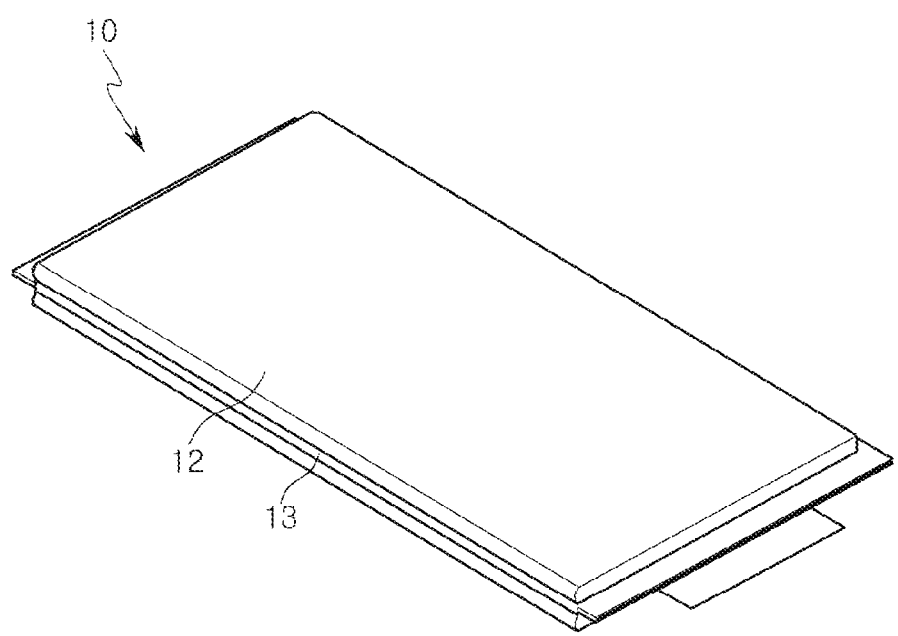
FIG. 2 is a perspective view of a secondary battery of the present disclosure.

Specifically, FIG. 1 is a front view of a secondary battery of the present disclosure, and FIG. 2 is a perspective view of a secondary battery of the present disclosure. Referring to FIGS. 1 and 2, a secondary battery according to an example embodiment includes a cell body member 12 accommodating an electrode assembly 11 therein and provided adjacently to a cooling plate member 21; and a heat conductive member 30 provided in at least a portion between the cell body member 12 and the cooling plate member 21 to form a heat path for transferring heat from the cell body member 12. The cell body member 12 may have a surface area-increasing groove 13 formed to be concave on a lower surface thereof in contact with the heat conductive member 30.

As the above, the cell body member 12 having the surface area-increasing groove 13 formed may increase a contact surface with the heat conductive member 30. In this regard, a heat path between the cooling plate member 21 can be expanded, thereby increasing heat conductivity.

Accordingly, the secondary battery 10 of the present disclosure can overcome a limitation on heat conductivity improvement, resulting from properties of the heat conductive member 30.

In this case, the cell body member 12 is provided with an electrode assembly 11 therein to serve to protect the electrode assembly 11. That is, the cell body member 12 may be suggested to provide an internal space accommodating the electrode assembly 11 formed of an anode, a cathode, a separation film, an electrolyte solution, and the like, followed by sealing the same.

As an example, the cell body member 12 may be provided as a pouch-type member or a can-type member. The pouch-type member is a form in which the electrode assembly 11 is accommodated on three surfaces, that is, a member configured to be in the form in which the electrode assembly 11, while being accommodated inside, is overlapped with and adhered to the three surfaces of an upper surface and both side surfaces mainly excluding a lower surface. The can-type member has a form in which the electrode assembly 11 is sealed and accommodated on one surface, that is, a member configured to be mainly in the form in which the electrode assembly 11, while being accommodated inside, is overlapped with and adhered to the one surface mainly excluding the three surfaces of the lower surface and the both side surfaces.

The cell body member 12, by a surface area-increasing groove 13 formed to be concave on a lower surface in contact with the heat conductive member 30, may increase the contact surface with the heat conductive member 30, and such heat path expansion may lead to improved heat conductivity.

As an example, the surface area-increasing groove 13 may be provided in a central portion of the lower surface of the cell body member 12 in a thickness direction X and may also have a form elongated in a length direction Z of the cell body member 12.

That is, the cell body member 12 of a secondary battery 10 according to an example embodiment may have the surface area-increasing groove 13 formed in the central portion in the thickness direction X to be elongated in the length direction Z.

As above, heat conductivity can be uniformly increased in the length direction Z of the cell body member 12 as the surface area-increasing groove 13 is formed to elongate in the length direction Z of the cell body member 12.

In addition to the surface area-increasing groove 13 formed in the central portion of on the lower surface, the cell body member 12 may have a rounded portion 14 formed at both ends in the thickness direction X to increase the contact surface with the heat conductive member 30, which will be described in detail with reference to FIG. 5A and FIG. 5B.

The cell body member 12 is provided with the surface area-increasing groove 13 formed to be asymmetrical, thereby preventing formation of an air gap when coupling to the heat conductive member 30, which will be described in detail with reference with FIGS. 2 and 3.

In this case, the electrode assembly 11, as a secondary battery 10, is a battery capable of repeating charging and discharging, due to reversible conversion between chemical energy and electric energy. Any secondary battery 10 conventionally used can be configured as the electrode assembly 11 without limitations. As an example, the electrode assembly 11 may be configured in a manner in which a cathode and an anode are cross-stacked on each other such that surfaces coated with respective electrode active materials face each other while having a separation film as a boundary therebetween.

Meanwhile, the electrode assembly 11 substantially includes an electrolyte solution and is received in the cell body member 12 to be used. The electrolyte solution may include an organic solvent such as ethylene carbonate (EC), propylene carbonate (PC), diethyl carbonate (DEC), ethyl methyl carbonate (EMC), dimethyl carbonate (DMC), or the like, together with a lithium salt such as $LiPF_6$, $LiBF_4$, or the like. Further, the electrolyte solution may be liquid, solid, or gel-type.

The cooling plate member 21 serves to release heat generated in the electrode assembly 11 accommodated in the cell body member 12. To this end, the cooling plate member 21 may receive the heat from the cell body member 12 mediated by the heat conductive member 30, or the like, and deliver the heat to an external heat sink, or the like, thereby being in contact with the external heat sink such that the cell body member 12 accommodating the electrode assembly 11 therein is cooled.

The heat conductive member 30 serves to deliver the heat generated during charging and discharging of the electrode assembly 11. To this end, the heat conductive member 30 may be provided between the cell body member 12 accommodating the electrode assembly 11 therein and the cooling plate member 21 in contact with the heat sink.

To this end, the heat conductive member 30 may be formed by, for example, the cell body member 12 being seated while being applied onto the cooling plate member 21, and the heat conductive member 30 being filled in the surface area-increasing groove 13 formed on the lower surface of the cell body member 12, thereby being provided between the cooling plate member 21 and the cell body member 12 to have a shape corresponding to a shape of the surface area-increasing groove 13.

Although not limited thereto, the heat conductive member 30 may be provided as a heat conductive adhesive, a heat conductive pad, or the like.

Figure 3A:
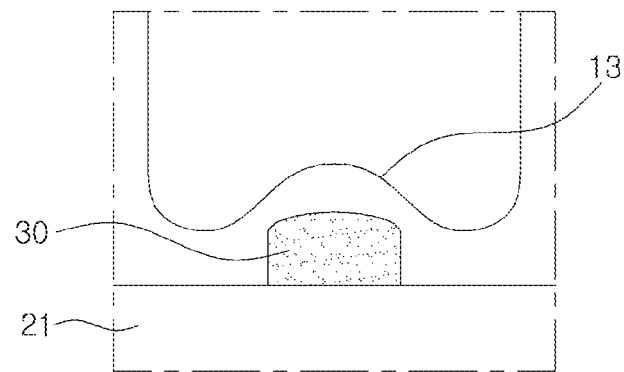
FIG. 3A and FIG. 3B are a front view of an example embodiment in which a surface area-increasing groove of a cell body member is formed to be symmetrical in a secondary battery of the present disclosure.
Figure 3B:
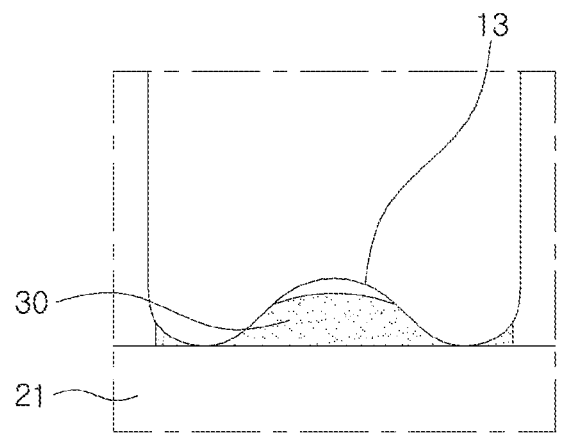
Figure 4A:
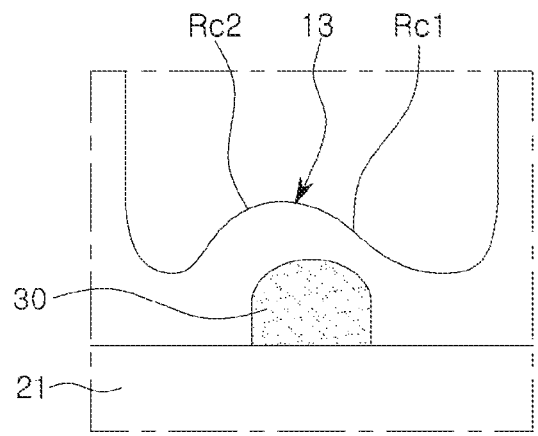
FIG. 4A to FIG. 4C are a front view of an example embodiment in which a surface area-increasing groove of a cell body member is formed to be asymmetrical in a secondary battery of the present disclosure.
Figure 4B:
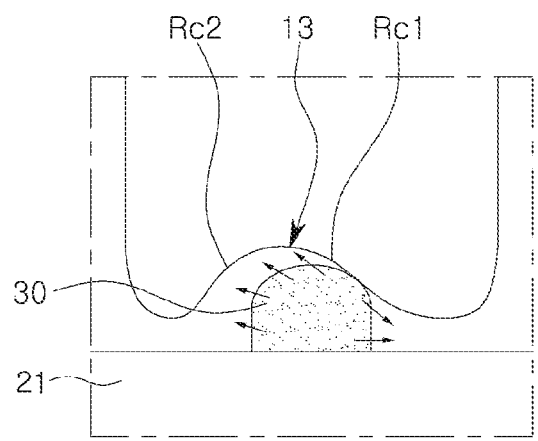
Figure 4C:
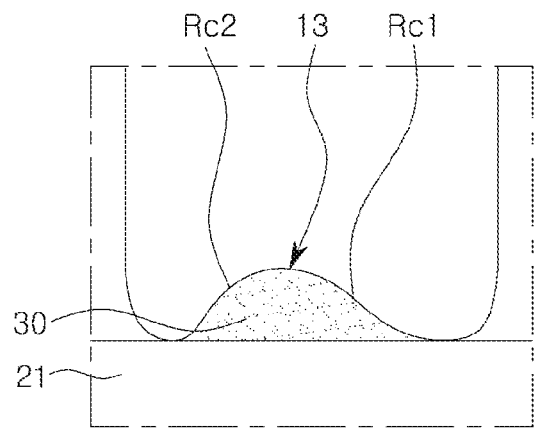

FIG. 3A and FIG. 3B are a front view of an example embodiment in which a surface area-increasing groove of a cell body member is formed to be symmetrical in a secondary battery of the present disclosure, and FIG. 4A to FIG. 4C are a front view of an example embodiment in which a surface area-increasing groove of a cell body member is formed to be asymmetrical in a secondary battery of the present disclosure.

Based on FIGS. 3 and 4, a cell body member 12 of a secondary battery 10 according to an example embodiment may have an asymmetrical surface area-increasing groove 13.

That is, the cell body member 12 of the present disclosure, due to the surface area-increasing groove 13 formed to be asymmetrical, can prevent an air gap from being formed when coupling to the heat conductive member 30.

This can be easily understood by comparing FIG. 3A and FIG. 3B illustrating an example embodiment in which the surface area-increasing groove 13 is formed to be symmetrical with FIG. 4A to FIG. 4C illustrating that in which the surface area-increasing groove 13 is formed to be asymmetrical.

In other words, when a radius of curvature of the symmetrical surface area-increasing groove 13 as shown in FIG. 3A is greater than that of the heat conductive member 30 applied onto the cooling plate member 12 before being in contact, an initial form in which the heat conductive member 30 is in contact with the surface area-increasing groove 13 includes an air gap between the surface area-increasing groove 13 and a top portion of the heat conductive member 30.

Even when the cell body member 12 is completely seated in the cooling plate member 21 while maintaining the above described state, a problem may arise as illustrated in FIG. 3B in that a state, in which an air gap is formed between the surface area-increasing groove 13 and the heat conductive member 30, is maintained.

Further, in this case, there may be a problem arising in that a portion of the heat conductive member 30, not filled in the air gap, deviates toward an outer side of the surface area-increasing groove 13.

When the surface area-increasing groove 13 is formed to be asymmetrical, however, such problems can be prevented.

That is, as illustrated in FIG. 4A, when the surface area-increasing groove 13 is formed to be asymmetrical, the cell body member 12 may be completely seated in the cooling plate member 21 without forming an air gap between the surface area-increasing groove 13 and the heat conductive member 30 regardless of a shape of the heat conductive member 30 being applied onto the cooling plate member 21.

In other words, when the cell body member 21 is in contact with the heat conductive member 30 applied onto the cooling plate member 21 and compress the heat conductive member 30, thus diffusing the heat conductive member 30, the heat conductive member 30 may be diffused via the asymmetrical surface area-increasing groove 13 as illustrated in FIG. 4B. As such, the heat conductive member 30 and the surface area-increasing groove 13 can be closely adhered to each other so that no air gap is formed, as illustrated in FIG. 4C.

More specifically, such an asymmetrical surface area-increasing groove 13 may be asymmetrical in the length direction Z of the cell body member 12, but is more preferably asymmetrical in the thickness direction X of the cell body member 12.

That is, in general, as the cell body member 12 is longer in the length direction Z compared to the thickness direction X, thereby facilitating formation of an air gap in the thickness direction X of the cell body member 12, the asymmetrical surface area-increasing groove 13 is formed in the thickness direction of the cell body member 12.

In other words, the surface area-increasing groove 13 of the secondary battery 10 according to an example embodiment is asymmetrical in the thickness direction X of the cell body member 12.

The surface area-increasing groove 13 having such an asymmetrical shape is a specific embodiment and may be limited as below.

That is, the surface area-increasing groove 13 of the secondary battery 10 according to an example embodiment may have one side having a first radius of curvature Rc1 in the thickness direction X of the cell body member 12 and the other side, connected thereto, formed to have a second radius of curvature Rc2, where the first and second radii of curvature Rc1 and Rc2 are different from each other to form the asymmetrical shape.

This is because when the heat conductive member 30 is in contact with the surface area-increasing groove 13 to diffuse, a space allowing in air between the heat conductive member 30 and the surface area-increasing groove 13 to be discharged can be easily secured due to an initial contact with a portion having a comparatively greater radius of curvature.

Figure 5A:
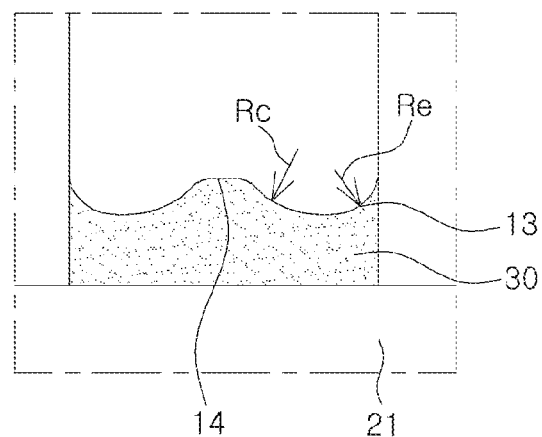
FIG. 5A and FIG. 5B are a front view of a rounded portion formed to have a smaller radius of curvature than that of a surface area-increasing groove in a cell body member of a secondary battery.
Figure 5B:
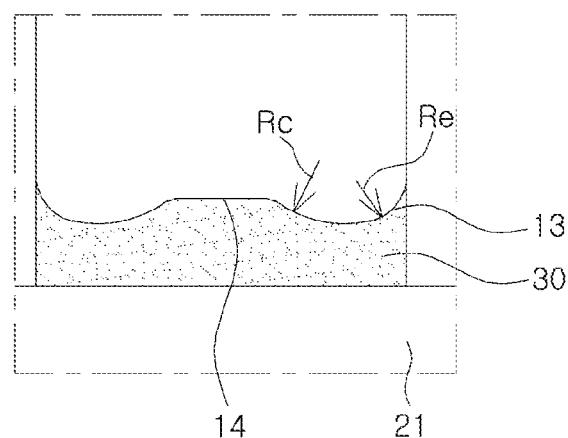

FIG. 5A and FIG. 5B are a front view of a rounded portion 14 formed to have a smaller radius of curvature than that of a surface area-increasing groove 13 in a cell body member 12 of a secondary battery 10. Referring to FIG. 5A and FIG. 5B, the cell body member 12 of a secondary battery 10 according to an example embodiment has the surface area-increasing groove 13 formed in a central portion in the thickness direction, and a rounded portion 14 formed at both ends in the thickness direction X.

As the above, the cell body member 12 may have a larger contact surface with the heat conductive member 30 by having the rounded portion 14 having a round shape formed at both ends in the thickness direction X in addition to the surface area-increasing groove 13 formed on the central portion of the lower surface.

That is, the rounded portion 14 is further formed in addition to the surface area-increasing groove 13 to increase an effective area for forming a heat transfer path by contacting with the heat conductive member 30 on the lower surface of the cell body member 12.

In this case, a radius of curvature Re of the rounded portion 14 having a round shape may be adjusted.

That is, the cell body member 12 of a secondary battery 10 according to an example embodiment may have the radius of curvature Re of the rounded portion 14 smaller than a radius of curvature Rc of the surface area-increasing groove 13.

As the above, the problem in that the heat conductive member 30 deviates toward an outer side of the lower surface of the cell body member 12 can be resolved by increasing a contact surface with the heat conductive member 30 due to the rounded portion 14 and forming the radius of curvature Re of the rounded portion 14 smaller than the radius of curvature Rc of the surface area-increasing groove 13.

In other words, as the cell body member 12 is seated in the heat conductive member 30 after the heat conductive member 30 is applied onto the cooling plate member 21, the heat conductive member 30 extends toward the rounded portion 14 while being accommodated in the surface area-increasing groove 13 formed in the central portion of the cell body member 12.

As the radius of curvature Re of the rounded portion 14 is smaller than the radius of curvature Rc of the surface area-increasing groove 13, an air gap between the rounded portion 14 and the cooling plate member 21 is disposed to be smaller than a gap between the surface area-increasing groove 13 and the cooling plate member 21.

In this regard, a space allowing the heat conductive member 30 to be discharged toward an outer side of the rounded portion 14 is reduced, and consequently, an amount of the heat conductive member 30 deviating toward the outer side of the lower surface of the cell body member 12 is reduced.

Figure 6:
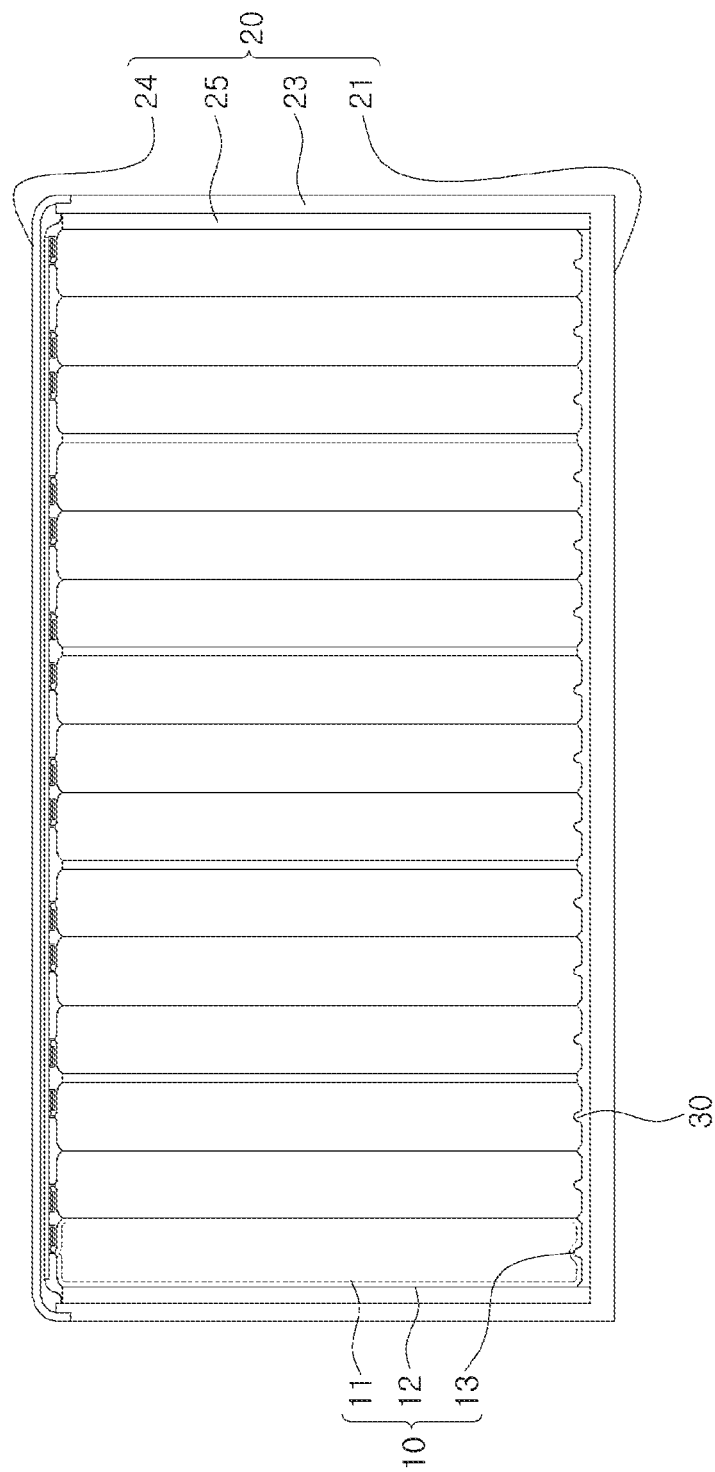
FIG. 6 is a front view of a secondary battery of the present disclosure and a battery module including the same.
Figure 7:
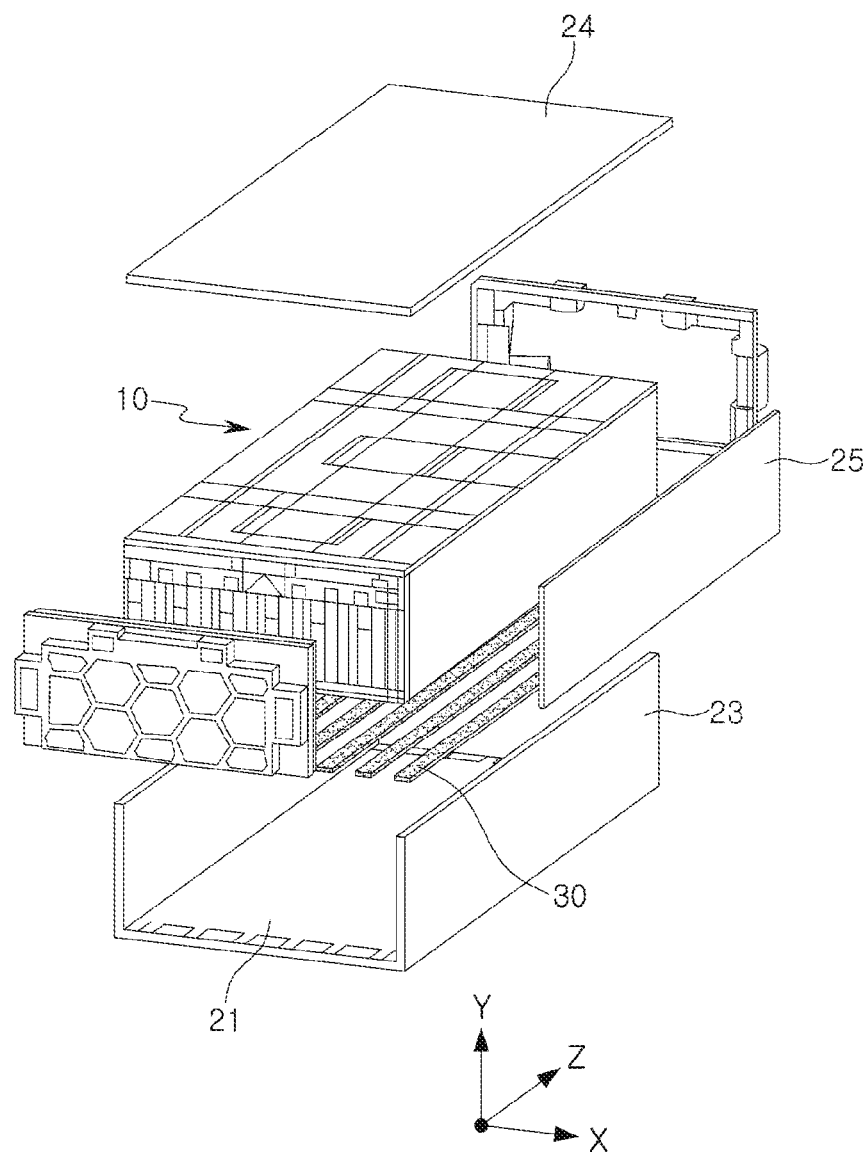
FIG. 7 is a perspective view of a disassembly of a battery module of the present disclosure.

FIG. 6 is a front view of a secondary battery of the present disclosure and a battery module including the same, and FIG. 7 is a perspective view of a disassembly of a battery module of the present disclosure.

Based on FIGS. 6 and 7, a battery module according to another example embodiment of the present disclosure includes a cell body member 12 accommodating an electrode assembly therein, and a heat conductive member 30 provided in at least a portion between the cell body member 12 and a cooling plate member; and a housing member 20 including the cooling plate member 21 for exchanging heat with the cell body member 12 mediated by the heat conductive member 30 and accommodating a plurality of the secondary batteries 10, wherein the cell body member 12 may include a surface area-increasing groove 13 formed to be concave on a lower surface thereof in contact with the heat conductive member 30.

As the above, the cell body member 12 having the surface area-increasing groove 13 may serve to increase a contact surface with the heat conductive member 30. In this regard, a heat path between the cooling plate member 21 is increased, thereby improving heat conductivity of the secondary battery 10.

Accordingly, the battery module including the secondary battery 10 of the present disclosure can overcome the limitation on heat conductivity improvement, resulting from the properties of the heat conductive member 30.

As the above, the secondary battery 10 included in the battery module may have the characteristics of the secondary battery 10 previously described.

That is, the surface area-increasing groove 13 of the battery module according to another example embodiment may be asymmetrical in the thickness direction X of the cell body member 12.

Further, the surface area-increasing groove 13 of the battery module according to another example embodiment may have one side formed to have a first radius of curvature Rc1 in the thickness direction X of the cell body member 12 and the other side, connected thereto, formed to have a second radius of curvature Rc2, wherein the first and second radii of curvature Rc1 and Rc2 are different from each other.

The cell body member 12 of the battery module according to another example embodiment may be formed with the surface area-increasing groove 12 in the central portion of the thickness direction X and a rounded portion 14 at both ends in the thickness direction X, wherein the radius of curvature Re of the rounded portion 14 is smaller than the radius of curvature Rc of the surface area-increasing groove 13.

In addition, when the cell body member 12 is seated and coupled onto the heat conductive member 30 applied to the cooling plate member 21, the surface area-increasing groove 13 of the battery module according to another example embodiment may have one side in contact with the heat conductive member 30, applied to the cooling plate member 21, having the first radius of curvature Rc1 larger than the second radius of curvature Rc2.

That is, the first radius of curvature Rc1 of one side, a portion of the surface area-increasing groove 13 in which the heat conductive member 30 is first in contact, is formed to be greater than the second radius of curvature Rc2 of the other side, thereby forming the asymmetrical shape.

In this regard, when the heat conductive member 30 is in contact with the surface area-increasing groove 13 to diffuse, the heat conductive member 30 is in first contact with the first radius of curvature Rc1, a comparatively great radius of curvature, thereby easily securing the space allowing in air between the heat conductive member 30 and the surface area-increasing groove 13 to be discharged.

In the case in which a plurality of the secondary batteries 10 are installed in the housing member 20, the heat conductive member 30 connected to the secondary batteries are provided in plural. In this case, an air gap is formed between neighboring heat conductive members 30, thereby adding air cooling effect and improving cooling performance.

To this end, the heat conductive member 30 may have a cross-sectional area of the cell body member 12 in the thickness direction smaller than that of the surface area-increasing groove 13.

That is, a volume of a hollow portion formed between the surface area-increasing groove 13 and the cooling plate member 21 may be formed to be larger than that of the heat conductive member 30 applied onto the cooling plate member 21. This facilitates that when the cell body member 12 is seated in the heat conductive member 30 applied onto the cooling plate member 21 such that the heat conductive member expands, an amount of the heat conductive member toward the outer side of the lower surface of the cell boy member 12 is reduced.

In addition, to ameliorate the deviation of the heat conductive member 30 toward the outer side of the lower surface of the cell body member 12, both ends of the cell body member 12 in the thickness direction X may be provided to be in contact with the cooling plate member 21, which will be described in detail with reference to FIG. 8.

Due to the configuration in which a plurality of the secondary batteries are installed, the housing member 20 serves to protect the secondary batteries 10 while delivering electric energy generated by the secondary batteries 10 to outside or to an external heat sink to cool.

Further, a bottom portion forming a lower portion of the housing member 20 may be formed of the cooling plate member 21.

In addition, a side wall member 23 forming a side portion of the housing member 20 may be provided at an edge of the cooling plate member 21, and the cooling plate member 21 may be formed to extend until reaching the side wall member 23.

A compression member 25 is provided in an inner side surface of the side wall member 23 to further firmly protect the secondary batteries 10.

In addition, the housing member 20 may include a cover member 24 provided on an upper end of the side wall member 23 to protect an upper end of the secondary batteries 10.

The housing member 20 may be provided with an additional configuration, such as a bus bar for electrically connecting the secondary battery 10 to the outside, or the like.

Figure 8:
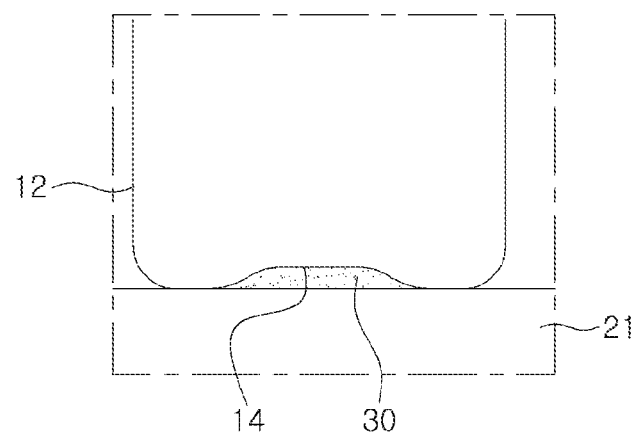
FIG. 8 is a front view of a disassembly of a battery module of the present disclosure.

FIG. 8 is a front view of a disassembly of a battery module of the present disclosure. Referring to FIG. 8, the cell body member 12 of the battery module according to another example embodiment has the surface area-increasing groove 13 formed in the central portion in the thickness direction X to accommodate the heat conductive member 30 and both ends in the thickness direction X formed to be in contact with the cooling plate member 21.

That is, both ends of the cell body member 12 in the thickness direction are provided to be in contact with the cooling plate member 21 to ameliorate the deviation of the heat conductive member 30 toward the outer side of the lower surface of the cell body member 12.

In other words, the lower surface of the cell body member compresses the heat conductive member 30 applied onto the cooling plate member 21 and the heat conductive member 30 expands when the secondary battery 10 is installed in the housing member 20. In this case, a region to which the heat conductive member 30 expands is limited by the arrangement of the cell body member 12.

As the above, as both ends of the cell body member 12 in the thickness direction X are seated in the cooling plate member 21 to be in contact therewith, the heat conductive member 30 is disposed only in the hollow portion formed by the surface area-increasing groove 13 formed in the central portion of the cell body member 12 in the thickness direction, an internal side of both ends of the cell body member 12 in the thickness direction.

In this regard, use of the heat conductive member 30 can be reduced while increasing or maintaining an effective contact surface between the cell body member 12 and the heat conductive member 30.

Figure 9:
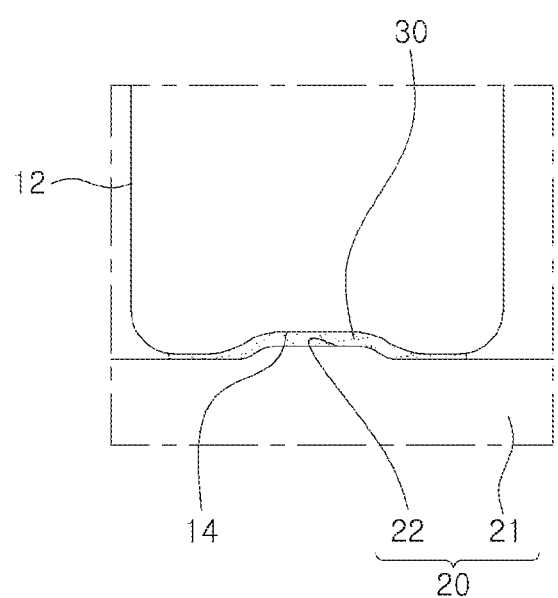
FIG. 9 is a front view of a battery module of the present disclosure, in which a surface-increasing tab is formed in a cooling plate member of a housing member.

FIG. 9 is a front view of a battery module of the present disclosure, in which a surface-increasing tab is formed in a cooling plate member of a housing member. Referring to FIG. 9, the cooling plate member 21 of the battery module according to another example embodiment may have a surface-increasing tab 22 formed to protrude from a portion in which the cell body member is seated and having at least a portion inserted in the surface area-increasing groove 13.

As the above, the formation of the surface-increasing tab 22 may serve to reduce use of the heat conductive member 30 as well as improving heat conductivity.

In other words, as the surface-increasing tab 22, a portion of the cooling plate member 21, increases a contact surface with the heat conductive member 30, a heat path between the heat conductive member 30 and the cooling plate member 21 can be expanded, thereby improving heat conductivity.

Further, since the surface-increasing tab 22 charges at least a portion of the hollow portion formed by the surface area-increasing groove 13 of the cell body member 12, use of the heat conductive member 30 disposed between the cell body member 12 and the cooling plate member 21 can be reduced.

In other words, use of the heat conductive member 30 can be reduced by filling the hollow portion, which needs to be charged by the heat conductive member 30, with the surface-increasing tab 22.

Specifically, the surface-increasing tab 22 of the battery module according to another example embodiment may be formed to protrude in a form corresponding to a shape of the surface area-increasing groove 13.

Due to such a configuration, an air gap is uniformly formed between the surface area-increasing groove 13 and the surface-increasing tab 22 in the thickness direction X of the cell body member 12, and accordingly, the heat conductive member 30 is formed to have a uniform thickness in the thickness direction X of the cell body member 12, thereby generating uniform heat conductivity in the thickness direction X of the heat conductive member 30.

Additionally, the surface-increasing tab 22 of the battery module according to another example embodiment may be formed to have a small width in the thickness direction of the cell body member 12 as compared to the surface area-increasing groove 13.

In other words, an air gap is formed between the surface-increasing tab 22 and the surface area-increasing groove 13 by having a cross-section of the surface-increasing tab 22 smaller than a cross-section of the hollow portion of the cell body member 12 formed by the surface area-increasing groove 13 in the thickness direction.

In this regard, a space in which the heat conductive member 30 can be provided may be secured between the surface area-increasing groove 13 of the cell body member 12 and the surface-increasing tab 22 of the cooling plate member 21.

According to the aforementioned example embodiments, the secondary battery of the present disclosure and the battery module including the same are advantageous in that a limitation relevant to heat conductivity enhancement due to properties of a heat conductive member can be overcome.

In another aspect, the secondary battery of the present disclosure and the battery module including the same are advantageous in being capable of improving heat conductivity while reducing use of a heat conductive member.

In this regard, the secondary battery of the present disclosure and the battery module including the same have effects of improving heat conductivity and preventing increased costs of products.

Various advantages and beneficial effects of the present disclosure are not limited to the above descriptions and may be easily understood in the course of describing the specific embodiments of the present disclosure.

While the example embodiments have been shown and described above, it will be apparent to those skilled in the art that modifications and variations could be made without departing from the scope of the present invention as defined by the appended claims.

The invention claimed is:

1. A secondary battery, comprising:
 a cell body member accommodating an electrode assembly therein and provided adjacently to a cooling plate member; and
 a heat conductive member provided in at least a portion between the cell body member and the cooling plate member to form a heat path for transferring heat from the cell body member to the cooling plate, and the heat conductive member provided as a beat conductive adhesive,
 wherein the cell body member is provided as a pouch-type member in which an upper surface and both side surfaces are adhered,
 wherein the cell body member comprises a groove portion formed to be concave in the lower surface thereof, and a protrusion portion formed in both ends of the cell body member in a thickness direction of the cell body member,
 wherein at least a portion of a curved region of the cell body member is in contact with the heat conductive member the lower surface,
 wherein the lower surface of the cell body member compresses the heat conductive member applied onto the cooling plate member,
 wherein the heat conductive member expands when the cell body member is seated in the heat conductive member applied onto the cooling plate member, and
 wherein a region into which the heat conductive member expands is limited by both ends of the cell body member.

2. The secondary battery of claim 1, wherein the cell body member is formed to have the groove portion formed to be asymmetrical.

3. The secondary battery of claim 2, wherein the groove portion is asymmetrical in the thickness direction of the cell body member.

4. The secondary battery of claim 3, wherein the groove portion has one side formed to have a first radius of curvature in the thickness direction of the cell body member and the other side, connected thereto, formed to have a second radius of curvature, wherein the first and second radii of curvature are different from each other.

5. The secondary battery of claim 1, wherein the cell body member is formed to have the groove portion formed in a central portion in the thickness direction of the cell body member to be elongated in a length direction.

6. The secondary battery of claim 1, wherein the cell body member is formed with the groove portion in a central portion of the thickness direction of the cell body member and a rounded portion at both ends in the thickness direction of the cell body member.

7. The secondary battery of claim 6, wherein the cell body member has the rounded portion having a radius of curvature smaller than a radius of curvature of the groove portion.

8. The secondary battery of claim 1, wherein the groove portion is formed in a central portion in the thickness direction of the cell body member to accommodate the heat conductive member.

9. A battery module, comprising:
 plurality of secondary batteries, each comprising a cell body member accommodating an electrode assembly therein, and a heat conductive member provided in at least a portion between the cell body member and a cooling plate member and the heat conductive member provided as a heat conductive adhesive; and a housing member comprising the cooling plate member for exchanging heat with the cell body member mediated by the heat conductive member and accommodating a-plurality the plurality of secondary batteries, wherein the cell body member is provided as a pouch-type ember in which an upper surface and both side surfaces are adhered, wherein the cell body member comprises a groove portion formed to be concave on a lower surface thereof in contact with the heat conductive member, and wherein at least a portion of a curved region of the cell body member is in contact with the heat conductive member on the lower surface, wherein the lower surface of the cell body member compresses the beat conductive member applied onto the cooling plate member, wherein the heat conductive member expands when the cell body member is seated in the heat conductive member applied onto the cooling plate member, wherein the cell body member further comprises a protrusion portion formed in both ends of the cell body member in a thickness direction of the cell body member, and wherein a region into which the heat conductive member expands is limited by both ends of the cell body member.

10. The battery module of claim 9, wherein the groove portion is asymmetrical in the thickness direction of the cell body member.

11. The battery module of claim 10, wherein the groove portion has one side formed to have a first radius of curvature in the thickness direction of the cell body member and the other side, connected thereto, formed to have a second radius of curvature, wherein the first and second radii of curvature are different from each other.

12. The battery module of claim 11, wherein, when the cell body member is seated and coupled onto the heat conductive member applied to the cooling plate member, the groove portion has the first radius of curvature of the one side initially contacting the heat conductive member applied to the cooling plate member greater than the second radius of curvature.

13. The battery module of claim 9, wherein the cell body member is formed with the groove portion in the central portion of the thickness direction of the cell body member and a rounded portion at both ends in the thickness direction of the cell body member, wherein a radius of curvature of the rounded portion is smaller than a radius of curvature of the groove portion.

14. The battery module of claim 9, wherein the cell body member comprises the groove portion formed in a central portion in the thickness direction of the cell body member to accommodate the heat conductive member and both ends in the thickness direction of the cell body member to be in contact with the cooling plate member.

15. The battery module of claim 9, wherein the cooling plate member has a surface-increasing tap formed to protrude from a portion in which the cell body member is seated and having at least a portion inserted in the groove portion.

16. The battery module of claim 15, wherein the surface-increasing tap is formed to protrude to correspond to a shape of the groove portion.

17. The battery module of claim 15, wherein the surface-increasing tap is formed to have a width smaller than a width of the groove portion in the thickness direction of the cell body member.

18. The battery module of claim 9, wherein the housing member further includes a side wall forming a side portion of the housing member.

19. The battery module of claim 9, wherein the housing member further includes a cover member provided on an upper end of the side wall to protect an upper end of the plurality of secondary batteries.

20. The battery module of claim 9, wherein the housing member further includes a bus bar for electrically connecting the plurality of secondary batteries.

* * * * *